(No Model.)
H. A. WRIGHT.
FLOOD GATE.
No. 404,761.                    Patented June 4, 1889.
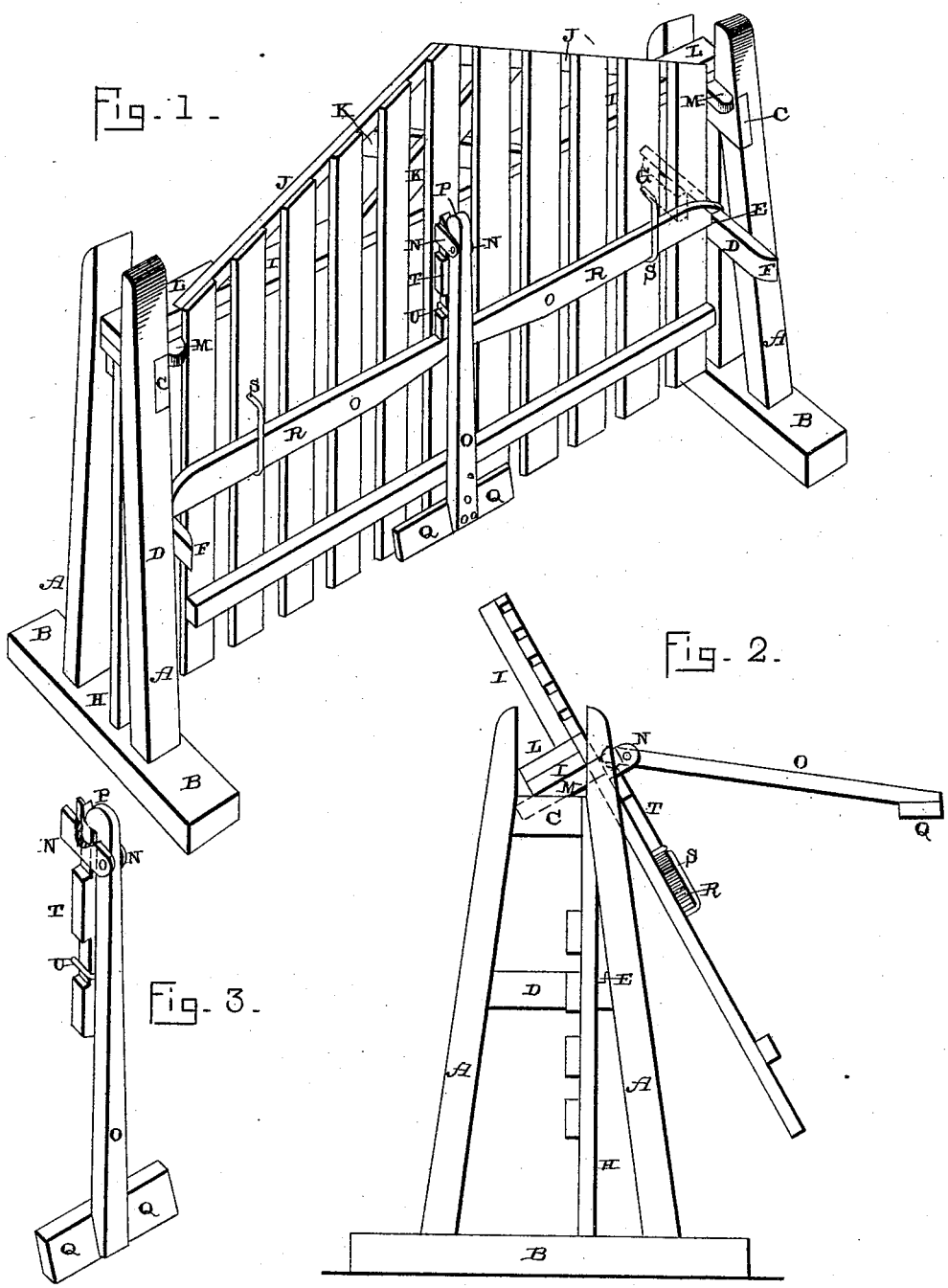

UNITED STATES PATENT OFFICE.

HENRY ANTHONEY WRIGHT, OF SPRING GARDEN, MISSOURI.

FLOOD-GATE.

SPECIFICATION forming part of Letters Patent No. 404,761, dated June 4, 1889.

Application filed March 23, 1889. Serial No. 304,464. (No model.)

*To all whom it may concern:*

Be it known that I, HENRY ANTHONEY WRIGHT, of Spring Garden, in the county of Miller and State of Missouri, have invented certain new and useful Improvements in Flood-Gates; and I do hereby declare the following to be a full, clear, and exact description of the invention, such as will enable others skilled in the art to which it pertains to make and use it, reference being had to the accompanying drawings, which form part of this specification.

My invention relates to an improvement in flood-gates; and the objects are to construct a gate that will automatically open when a heavy flow of water acts upon the lower end of a lever that operates the latch through mechanism hereinafter described, to construct a flood-gate that can be made of any desired length without sagging or breaking at the middle, and so to form the bearings that the gate will not open until the pressure of water is sufficient, even though the latches are released.

Figure 1 is a perspective of a gate embodying my invention, the gate closed. Fig. 2 is an end elevation of the same, the gate being shown open. Fig. 3 is a detached perspective view of the lever and the vertically-sliding rod.

A A represent the supporting-posts, that may either be fastened at their lower ends to base-blocks B, secured to the ground upon opposite sides of the stream, or may have their lower ends planted in the banks of the stream. As shown, the supporting-posts A A have their lower ends considerably separated, while their upper ends are brought near together and rigidly connected by the transverse bars C. These transverse bars C form the support for the gate and are made flat upon their upper surface, for the purpose hereinafter described. Extending across the posts A near their centers, and rigidly connected at each end to them, are the bars D. Made in the upper edges of these bars are notches E, with which the outer ends of the latches engage. One end of each of these bars is made to extend beyond the adjacent post A, and is beveled, as shown at F. These extending beveled ends form guides for the gate as it closes after it has been opened by a heavy flow of water, should the gate become in any manner twisted or misplaced. Thus the bars D have a double function.

As the gate drops back to a vertical position, it is limited in its movement by the stops G, (shown in dotted lines,) secured to the bars D, and thus the latches are relieved from any sudden strain when the gate is closed. In order to make the supporting structure more firm and rigid, a vertical post or brace H is connected at its upper end to one of the posts A at each end of the gate and to the supporting transverse bars C.

The gate proper consists of the flat cross supporting-beam I and the vertical bars K which are secured at and near their upper ends to the edge of the beam. The upper end of the gate above this beam runs to a point at the center, and is braced by the rods J and the cross-braces K. Secured to the ends of the beam I, upon its upper surface, are the blocks L, upon which the outer ends of the braces J rest. Rigidly secured to the under side of the ends of the beam I, just inside of the post A, are the transverse guiding-bars M. These guiding-bars M prevent the gate from having any endwise movement when it is open, as shown in Fig. 2, and also guide it smoothly back to position until the gate comes between the extended ends of the bars D.

Secured preferably to the center vertical bar are the brackets N, between the outer ends of which is pivoted the upper end of the operating-lever O. The upper end of this lever above its pivotal point is provided with a cam or projection P, and the lower end with a transverse block Q of a suitable size.

R represents two horizontal latches, that are pivoted to the vertical bars at a point inside of their centers, so that their outer ends will drop by gravity into the notches made in the bars D. Loops S are secured to the bars near the outer ends of the latches, which pass over them and which guide and support their outer ends.

T indicates a vertically-sliding rod, which is placed between the upper pivoted end of the lever O and the inner ends of the latches. The upper end of this sliding rod is beveled away, as shown, so as to coact with the projection upon the upper end of the lever O, while its lower end rests upon the inner ends of the latches. Passing around this rod T near its center, where it is reduced in size, is the guiding-loop U, secured to the adjacent bar of the gate. As shown, this rod is preferably reduced in size at its upper end, so as to pass between the brackets N.

The vertical bars of which the gate is composed are fastened to the edge of the beam I, so that the flat surface of the beam will rest upon the supports C when the gate is closed, and so that the beam will stand upon or nearly upon its edge when the gate is open, as shown in Fig. 2. By this construction the gate will not open until a very heavy pressure is upon it and it is absolutely necessary that it should open, even though the latches are disengaged from the notches. The latches are only used to hold the gate closed against cattle, while the pressure at which the gate will open is regulated to a great extent by the width of the flat bearing-surface of the outer ends of the beam I upon the bars C. This construction also enables a very long gate to be produced without any danger of its being broken or sagged at its middle when open. As shown in Fig. 2, the beam is on or nearly on its edge when the gate is open, in which position it will stand a very high strain; but where the beam I, which forms the support and pivot of the gate, is made of round or square timber it has to be made of such heavy material as to make it entirely impracticable for large gates.

My construction enables large gates to be made with a light supporting-timber, which, when upon or nearly upon its edge, will stand a heavy strain.

Having thus described my invention, I claim—

1. A flood-gate composed of vertical bars connected at their lower ends by a cross-bar, and their upper ends secured to the edge of a flat supporting and pivotal timber, in combination with suitable supporting-posts, whereby the supporting-timber when the gate is open will be approximately upon its edge, for the purpose described.

2. The combination, with a flood-gate, of the flat supporting and pivotal beam I, the posts A, bars C, flat upon their upper surfaces, and the transverse guiding-bars M, secured to the under side of the beam I near its ends, for guiding the gate and preventing endwise movement thereof when the gate is open, substantially as shown.

3. In a flood-gate, the combination of the gate, the latches pivoted thereto, the supporting-posts upon which the gate is pivoted, the operating-lever provided with a block at its lower end and a projection or cam at its upper end, the brackets secured to the gate near its upper end, between which the upper end of the lever is pivoted, and a vertically-sliding rod having its upper end beveled away to coact with the upper end of the lever, and a guiding-loop passed around it and secured to the gate, the lower end of the vertical sliding rod engaging the inner ends of the latches, whereby, when the lower end of the lever is acted upon by the water, the outer ends of the latches are raised, substantially as specified.

In testimony whereof I affix my signature in presence of two witnesses.

HENRY ANTHONEY WRIGHT.

Witnesses:
A. S. ULMAN,
E. C. McENTIRE.